(12) United States Patent
Frederiksen

(10) Patent No.: US 9,371,178 B2
(45) Date of Patent: Jun. 21, 2016

(54) TRANSPORTATION AND STORAGE SYSTEM FOR WIND TURBINE BLADES

(71) Applicant: LM Glasfiber A/S, Kolding (DK)

(72) Inventor: Henrik Frederiksen, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 0 days.

(21) Appl. No.: 14/310,485

(22) Filed: Jun. 20, 2014

(65) Prior Publication Data

US 2014/0353266 A1 Dec. 4, 2014

Related U.S. Application Data

(63) Continuation of application No. 13/812,644, filed as application No. PCT/EP2011/062525 on Jul. 21, 2011, now Pat. No. 8,967,929.

(30) Foreign Application Priority Data

Aug. 12, 2010 (EP) .................................... 10172602

(51) Int. Cl.
| | |
|---|---|
| *B60P 3/40* | (2006.01) |
| *B65D 88/12* | (2006.01) |
| *B65D 85/68* | (2006.01) |
| *F03D 1/00* | (2006.01) |

(Continued)

(52) U.S. Cl.
CPC ............ *B65D 88/129* (2013.01); *A47F 7/0021* (2013.01); *B60P 3/40* (2013.01); *B65D 61/00* (2013.01); *B65D 85/68* (2013.01); *F03D 1/005* (2013.01); *B65D 2585/649* (2013.01); *B65D 2585/6897* (2013.01); *Y02E 10/72* (2013.01)

(58) Field of Classification Search
CPC .......................................................... B60P 3/40
USPC ............................................................ 410/44
See application file for complete search history.

(56) References Cited

U.S. PATENT DOCUMENTS

| 6,983,844 B2 | 1/2006 | O'Kane et al. |
| 7,591,621 B1 | 9/2009 | Landrum et al. |
| 7,704,024 B2 | 4/2010 | Kootstra et al. |

(Continued)

FOREIGN PATENT DOCUMENTS

| CN | 101259897 A | 9/2008 |
| CN | 101648539 A | 2/2010 |

(Continued)

*Primary Examiner* — H Gutman
(74) *Attorney, Agent, or Firm* — Nath Goldberg & Meyer; Jerald L. Meyer; Tanya E. Harkins

(57) ABSTRACT

A transportation and storage system for a wind turbine rotor blade comprises a tip end frame assembly comprising a tip end receptacle and a tip end frame. The tip end receptacle comprises an upwardly open tip end-receiving space for receiving a portion of the tip end of the blade and having a supporting surface for supporting the blade, a lower surface allowing the tip end receptacle to rest upright on a substantially horizontal surface, such as the ground, and releasable retaining means for releasably retaining the tip end of the blade in the receiving space of the tip end receptacle. The tip end frame comprises an upwardly open receptacle-receiving space for receiving the receptacle and provided with positioning means for positioning the receptacle in the tip end frame. A base part defines a bottom surface allowing the tip end frame to rest upright on the ground.

14 Claims, 9 Drawing Sheets

Figure 1:
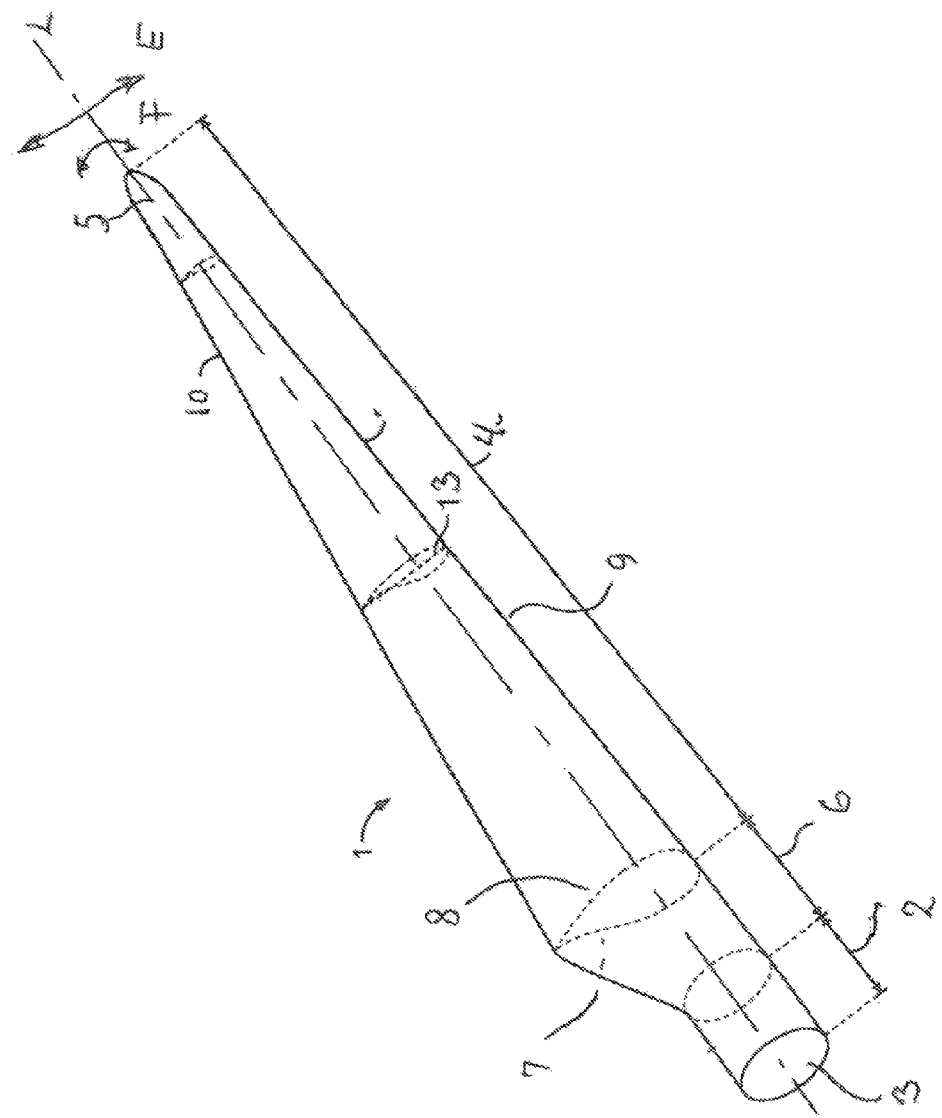

(51) Int. Cl.
*A47F 7/00* (2006.01)
*B65D 61/00* (2006.01)

(56) References Cited

U.S. PATENT DOCUMENTS

| | | |
|---|---|---|
| 7,967,536 B2 | 6/2011 | Broderick et al. |
| 8,177,462 B2 | 5/2012 | Riddell |
| 8,602,700 B2 | 12/2013 | Johnson |
| 2004/0217037 A1 | 11/2004 | O'Kane et al. |
| 2007/0177954 A1 | 8/2007 | Kootstra et al. |
| 2007/0253829 A1 | 11/2007 | Wessel et al. |
| 2009/0169323 A1 | 7/2009 | Livingston |
| 2009/0274529 A1 | 11/2009 | Broderick et al. |
| 2015/0198140 A1* | 7/2015 | Sigurdsson ............ F03D 1/005 211/60.1 |
| 2015/0300314 A1* | 10/2015 | Van Der Zee ............ F16B 2/08 211/85.8 |
| 2015/0369209 A1* | 12/2015 | Datta ........................ B60P 3/40 211/85.8 |

FOREIGN PATENT DOCUMENTS

| | | |
|---|---|---|
| EP | 1849719 A1 | 10/2007 |
| EP | 2239459 A2 | 10/2010 |
| WO | 0204321 A2 | 7/2001 |
| WO | 2006000230 A1 | 1/2006 |
| WO | 2006061806 A2 | 6/2006 |
| WO | 2007093854 A2 | 8/2007 |
| WO | 2009141018 A2 | 10/2008 |

* cited by examiner

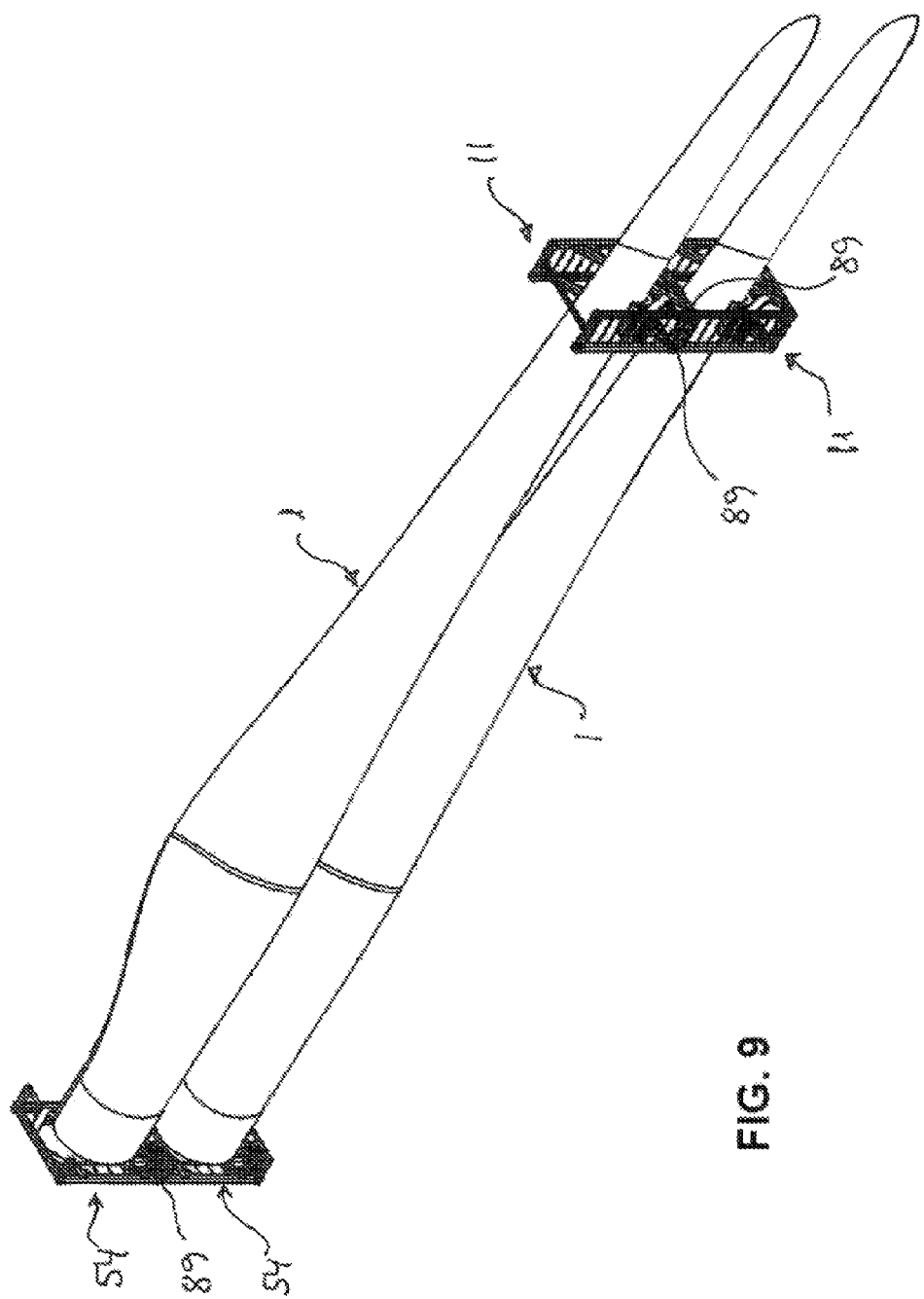

TRANSPORTATION AND STORAGE SYSTEM FOR WIND TURBINE BLADES

This is a Continuation Application of U.S. patent application Ser. No. 13/812,644, filed Jan. 28, 2013, which is a 371 application of PCT/EP11/62525, filed Jul. 25, 2011 and claims benefit to European Patent Application 10172602.4, filed Aug. 12, 2010, the contents of each of which are hereby incorporated by reference in their entirety.

TECHNICAL FIELD

The present invention relates to a system for transportation, storage and handling of wind turbine blades.

BACKGROUND

Often, transporting wind turbine blades from the production facility to the site of wind turbine or the wind turbine power plant requires many transportation steps. Typically, the blades are transported by truck, train or ship and again by truck to the site of the wind power plant. Additionally, reloading between the different types of transportation is needed. Finally, the blades are stored at the production facility and at the site of the wind turbine power plant.

Different types of transportation and/or storage systems for wind turbine blades are known from WO 2007/093854, US 2007/253829, WO 2002/04321, WO 2006/061806, US 2007/177954, US 2004/0217037, WO 2006/000230 and EP 1849719.

US 2009/0274529 discloses a transportation system for long blades comprising a root support frame and an intermediate support frame. The intermediate support frame consists of an upper frame and a lower frame. The lower frame has at its base an auxiliary element including a ball joint through which is coupled an openable and closable clamp adapted to receive the intermediate portion of the blade in a receiving space thereof. The clamp, which is coupled to the auxiliary element by means of the ball joint, is provided with a ball joint part which does not allow it to rest upright on a horizontal surface. Thus, it is not possible to support the intermediate portion of the blade only by means of the clamp.

CN 101648539 discloses a transportation system for a wind turbine blade comprising a root support frame and an intermediate support frame. The intermediate support frame comprises support parts being adapted to surround and support the intermediate portion of the blade. The support parts are provided with positioning means and stacked on a base plate. Additionally, the support parts are held together by means of transversely and laterally extending rails or bars. In the space defined by the base plate no positioning means seem to be provided for positioning the support parts in the above space. The intermediate support frame supports the blade at a point within the inboard 50% of the length of the blade.

EP 2239459 discloses a transport system for wind turbine blades comprising a root frame structure for supporting the root end and a fixation device for fixating and supporting the blade between the root end and the tip end of the blade. The fixation device comprises a fixation means which can be received in the fixation device. The fixation devices can be stacked on top of each other. Further, the root frame structures may be placed in a main frame structure. Correspondingly, the fixation devices may be placed in a base frame structure. The fixation means does not have a lower surface allowing it to rest upright on a horizontal surface.

DISCLOSURE OF THE INVENTION

An object of the present invention is to provide an improved or alternative system for transportation, storage and handling of wind turbine blades.

A further object of the invention is to provide a system enabling the wind turbine blades to be handled, stored and transported according to the need therefor.

The above and further objects of the invention are obtained by a transportation and storage system for a wind turbine rotor blade having a longitudinal axis and comprising a root end, a root region, an airfoil region with a tip, a pressure side and a suction side, wherein the system comprises a tip end frame assembly comprising a tip end receptacle and a tip end frame.

The tip end receptacle comprises:

an upwardly open tip end-receiving space for receiving a portion of the tip end of the blade, i.e. a point of the outer 50% of the blade, and having a supporting surface for supporting the blade, a lower base part defining a lower surface allowing the tip end receptacle to rest upright on a substantially horizontal surface, such as the ground, and releasable retaining means for releasably retaining the tip end of the blade in the receiving space of the tip end receptacle.

The tip end frame comprises an upwardly open receptacle-receiving space for receiving the tip end receptacle end provided with positioning means for positioning the tip end receptacle in the tip end frame;

a first lateral frame part and a second lateral frame part being laterally spaced apart and being mutually rigidly connected by means of transversely extending and interspaced transverse frame parts being upwardly open so as not to interfere with a blade arranged in a tip end receptacle received in the receptacle-receiving space of the tip end frame, and a base part defining a bottom surface allowing the tip end frame to rest upright on a substantially horizontal surface, such as the ground.

The term tip end is to be understood as a point of the outer 50% of the length of the blade as seen from the root end. However, in most cases the tip end receptacle is arranged at a point of the outer 30% of the length of the blade.

Since the tip end frame assembly comprises a tip end receptacle and a tip end frame, it is possible to store and transport a blade using only the tip end receptacle or by the tip end receptacle being received in the tip end frame. Thus, the blade may be stored at the production facility and at the wind turbine power plant merely by means of the tip end receptacle, thereby facilitating the handling of the blade, as the tip end frame is more bulky and heavy than the tip end receptacle. Correspondingly, the blade may be transported on the platform of a truck merely by using the tip end receptacle. On the other hand, the blade may be transported by using both the tip end receptacle and the tip end frame when transported by train or ship.

According to an embodiment of the invention, the supporting surface of the tip end receptacle may be shaped so as to at least partly conform to a surface contour of the blade in order thereby to distribute the load on the blade to a relatively large area.

According to a further embodiment of the invention, the supporting surface of the tip end receptacle may be shaped so as to support a portion of the leading edge or trailing edge and an adjacent portion of the suction side and/or an adjacent portion of the pressure side of the blade. As wind turbine blades generally have larger stiffness in the edgewise direction, i.e. the direction between the leading and trailing edge than in the flapwise direction, i.e. the direction perpendicular to the edgewise direction, it is advantageous that the blade rests at least partly on the trailing or the leading edge. In other words, it is advantageous that the supporting surface of the tip end receptacle is shaped so that the edge-wise direction of the blade forms an angle of between 5-40° with vertical, alternatively of between 10-30° with vertical.

According to an additional embodiment of the invention, the supporting surface of the tip end receptacle may be made of a material preventing scratching of the surface of the blade. The non-scratching supporting surface can be formed of a wood material, a rubber material, a textile material or a polymer material, e.g. a foamed polymer, such as foamed polyurethane.

It should further be noted that the supporting surface of the tip end receptacle may be made of a flexible material being able to at least partially adapt to the surface of the blade.

In a further embodiment of the invention, the tip end receptacle may have a rectangular outline with a pair of opposite lateral faces and a pair of opposite transversely extending transverse faces. Thereby, at least lower portions of said lateral and transverse faces of the tip end receptacle form positioning means adapted to interact with the positioning means of the receptacle-receiving space of the tip end frame so as to position the receptacle in the tip end frame. In this respect, it should be noted that the receptacle-receiving space of the tip end frame advantageously may be defined by elements defining a shape corresponding to the rectangular outline of the tip end receptacle.

According to yet another embodiment of the invention, the tip end receptacle may comprise an upwardly open, box-shaped, rigid structure in which is accommodated a block of material, said block forming the tip end-supporting surface of the tip end-receiving space. It is preferred that the supporting of the block extends above or beyond the upper edges of the box-shaped structure to keep the surface of the blade received in the receiving space away from said edges.

The block may be a block of non-scratching material, such as a block of a rubber material, a wood material or a polymer material, e.g. a foamed polymer material, such as foamed polyurethane.

The block may be removably received in the box-shaped structure. As a result, it is possible to use the box-shaped structure for blocks having a supporting surface of different shapes, said shapes being adapted to different blades.

According to an additional embodiment, the tip end frame may comprise lower stacking means in the base part thereof and upper stacking means at a top thereof, said lower stacking means being arranged so as to be connected with an upper stacking means by means of locking means to allow stacking of a first tip end frame on top of a second tip end frame, said lower stacking means defining at least a portion of the bottom surface of the tip end frame. The ability of stacking the tip end frames, and thereby blades received therein, is especially useful when transportation takes place by ship or train. However, stacking may be also useful at the production facility in case of lack of space.

According to an embodiment, the lower and the upper stacking means may be standard container corners being interspaced by a distance corresponding to a standard used in transportation and/or handling of containers. It is thus possible to connect the tip end frame to standard connection devices on-board ships and trains used for transportation of containers.

The stacking means, such as standard container corner, may preferably be adapted to be interlocked by means of twist locks or other types of locks being used in container transportation.

According to an embodiment of the invention, the retaining means may be a strap device comprising one or more straps and extending above the blade between lateral portions of the tip end receptacle. By using one or more straps the blade may be pressed firmly against the supporting surface and reliably retained in the tip end receptacle.

According to an embodiment, the strap device may comprise at least one contact member preferably having a surface of a non-scratching material and being adapted to be in contact with the blade opposite the blade-supporting surface of the receiving space of the tip end receptacle.

The strap device may also comprise a U-shaped member having two legs and being adapted to extend around the trailing or leading edge of the blade, each leg being provided with a contact member preferably provided with a surface of a non-scratching material and adapted to be in contact with the pressure side and the suction side of the blade opposite the supporting surface of the receiving space of the tip end receptacle.

Further, the strap device may comprise a contact member having a surface contour substantially following the surface contour of the trailing or leading edge thereof.

According to an embodiment of the invention, the tip end frame may comprise connecting means for releasably connecting the tip end receptacle with the tip end frame.

The connecting means may comprise at least one strap connecting the tip end receptacle with the tip end frame.

In order to save weight, the lateral frame parts of the tip end frame may be formed as a latticework of bars.

Correspondingly, the transverse frame parts of tip end frame may be formed as a latticework of bars, said bars may form triangular spaces therebetween to provide transverse stiffening of the tip end frame.

According to yet an embodiment of the invention, the transverse frame parts of the tip end frame may be longitudinally interspaced so that inwardly facing surfaces thereof provide longitudinal positioning means for the tip end receptacle and the transverse frames parts may be interconnected by means of connections means, such as interspaced and preferably parallel bars forming a support for the lower surface of the tip end receptacle and by means of interspaced bars with inwardly facing surfaces providing lateral positioning means for the tip end receptacle. The connection means forming a support for the tip may also be a plate connected between the transverse frame parts.

The above embodiment is particularly advantageous when the tip end receptacle has a rectangular outline as mentioned above.

The tip end frame may comprise an attachable and removable top bar adapted to extend between upper portions of the lateral frame parts to provide additional lateral stiffness to the tip end frame.

According to an additional embodiment of the invention, the system may further comprise a root frame assembly comprising a root end fixture and a root end frame.

The root end fixture is adapted to be temporarily received in the root end frame and comprises:

longitudinal positioning means for longitudinally positioning the root end fixture relative to the root end, a releasable connecting means for releasably connecting the root end fixture to the root end of the blade, and a lower surface allowing the root end fixture to rest on a substantially horizontal surface, such as the ground.

The root end frame comprises
positioning means for positioning the root end fixture relative to the root end frame, and
a lower base part defining a bottom surface allowing the root end frame to rest on a substantially horizontal surface, such as the ground.

The root end frame may further comprise attaching means for attaching and locking the root end fixture to the root end frame.

The longitudinal positioning means of the root end fixture may comprise at least one plate having at least two through-going openings adapted to receive connecting members adapted to be connected with mating connecting elements in the root end, such as bolts adapted to be connected with threaded bushings in the root end.

According to an embodiment of the invention, the root end frame may comprise an upwardly open root end fixture-receiving space for receiving a lower portion of the root end fixture, said receiving space being defined by mutually facing surfaces of lateral transversely interspaced frame parts and mutually facing surfaces of longitudinally interspaced frame parts, said mutually facing surfaces of the transversely interspaced and longitudinally interspaced frame parts, respectively, forming the positioning means of the root end frame cooperating with corresponding outer surfaces of the root end fixture for positioning the root end fixture relative to the root end frame. Thus, it is possible to lower the root end fixture into the root end fixture-receiving space and position the root end fixture in the root end frame.

Further, according to an embodiment of the invention, the root end frame may comprise lower stacking means in the bottom surface thereof and upper stacking means at a top thereof, said lower stacking means arranged so as to be connected with the upper stacking means to allow stacking of a first root frame on top of a second root frame, said lower stacking means defining at least a portion of the bottom surface of the root end frame, allowing the root end frame to rest on a substantially horizontal surface, such as the ground. Allowing stacking of root end frames and thereby of blades received therein, is—as indicated above—advantageous when transportation takes place by ship or train or in case of limited storage space at the production facility.

Advantageously, the lower and upper stacking means of the root end frame may be standard container corners being interspaced by a distance corresponding to a standard used in transportation and/or handling of containers.

Further, the stacking means, such as standard container corners, of the root end frame may advantageously be adapted to be interlocked by means of locking means, such as twist locks or other types of locks used in connection with containers.

The root end frame may be formed as a latticework of bars. Correspondingly, the root end fixture may be formed as a latticework of bars.

BRIEF DESCRIPTION OF THE DRAWING(S)

Figure 2:
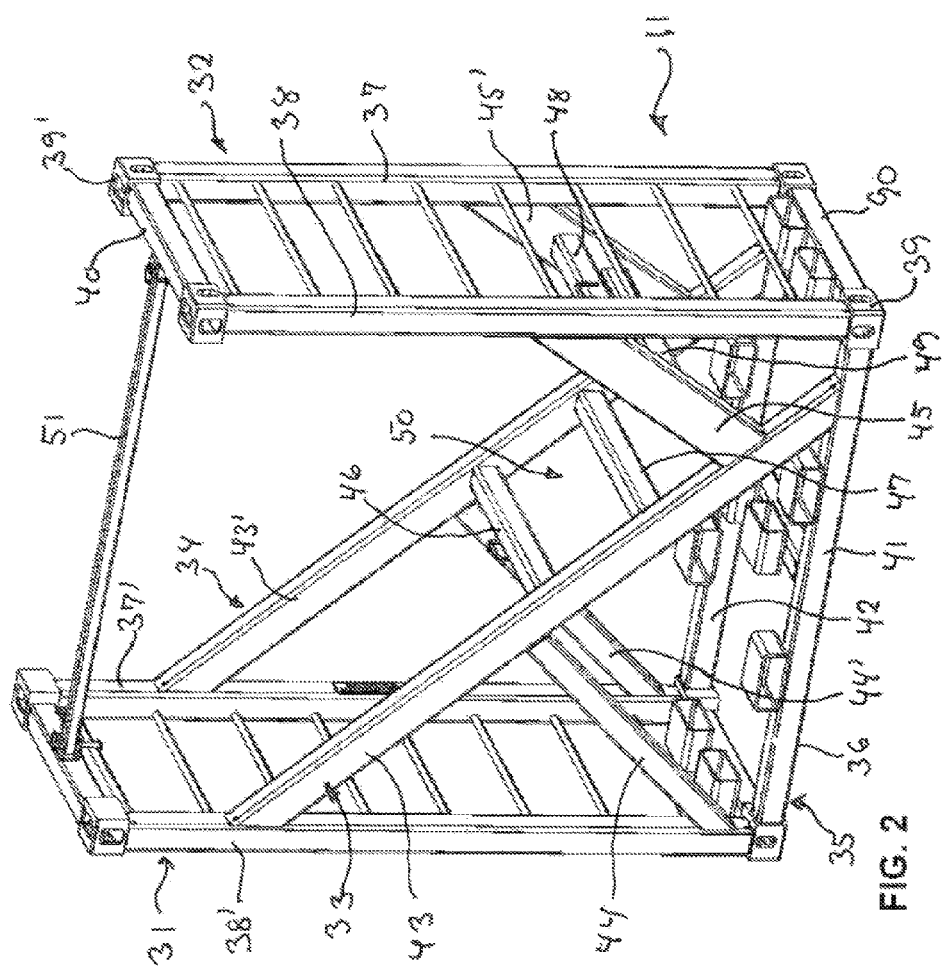
Figure 3:
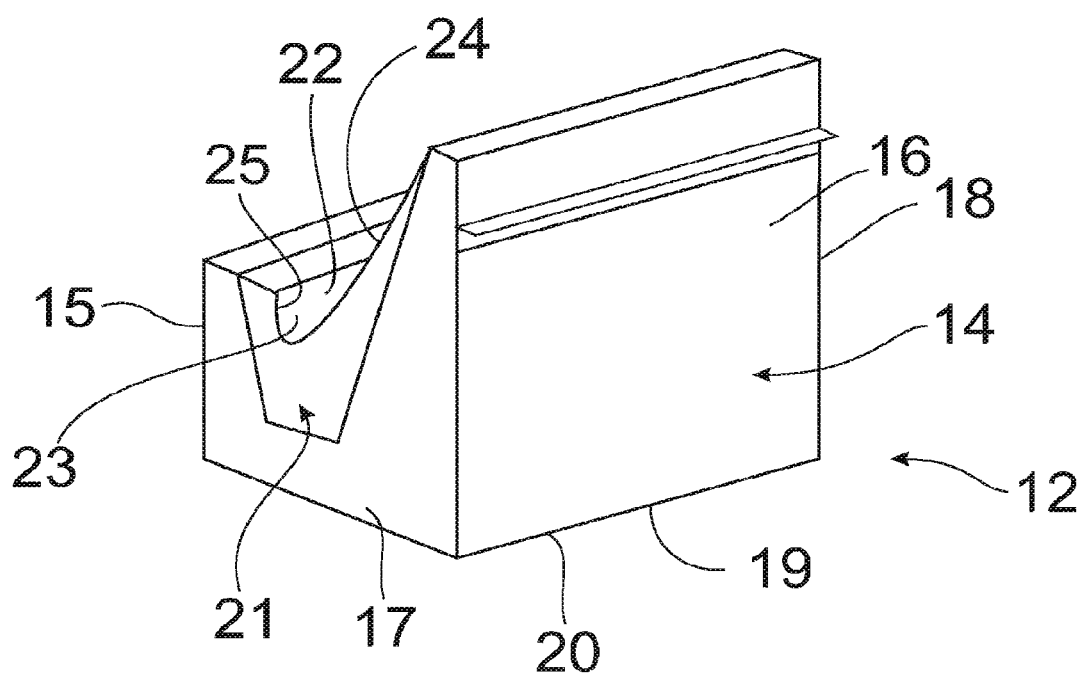
Figure 4:
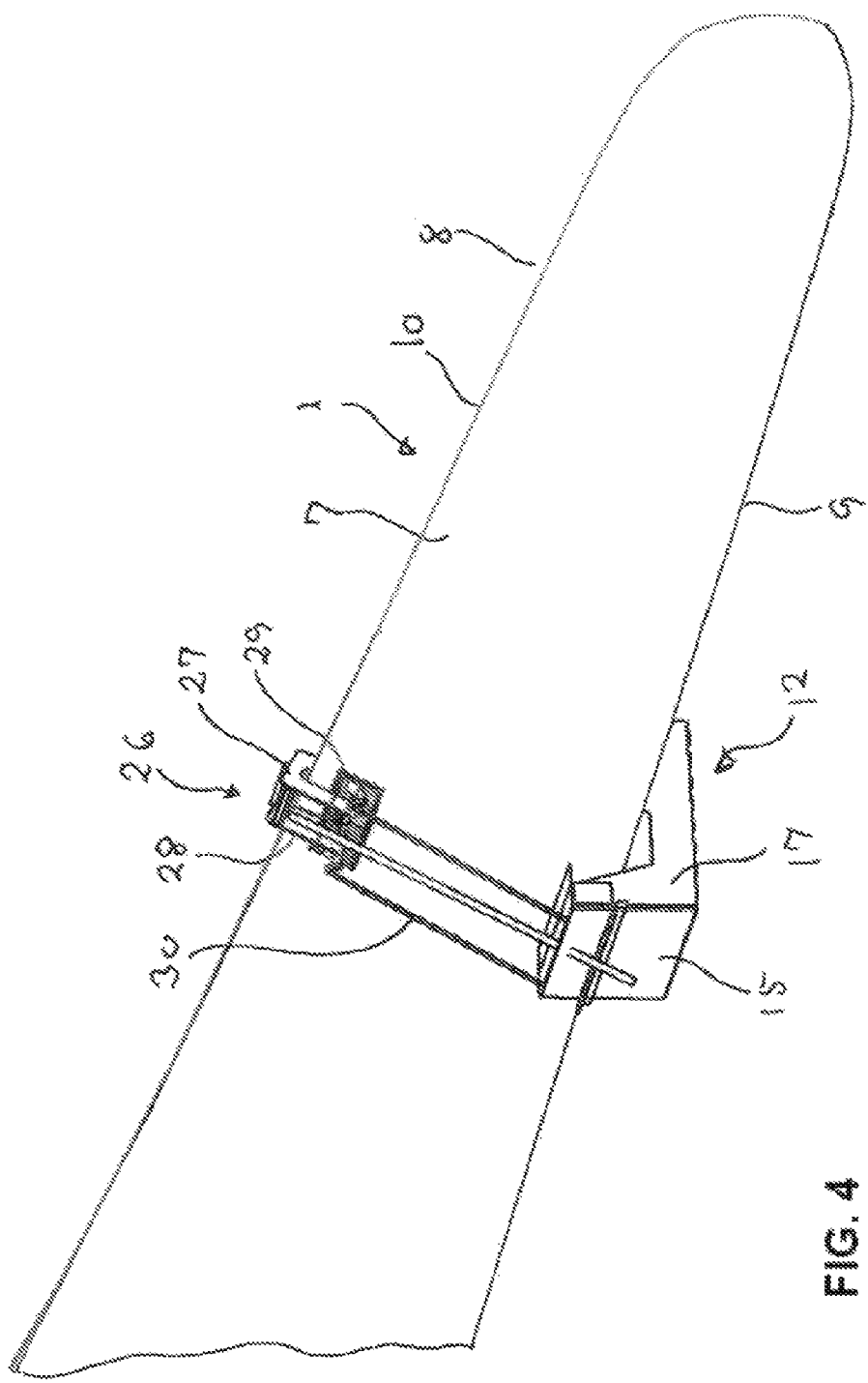
Figure 5:
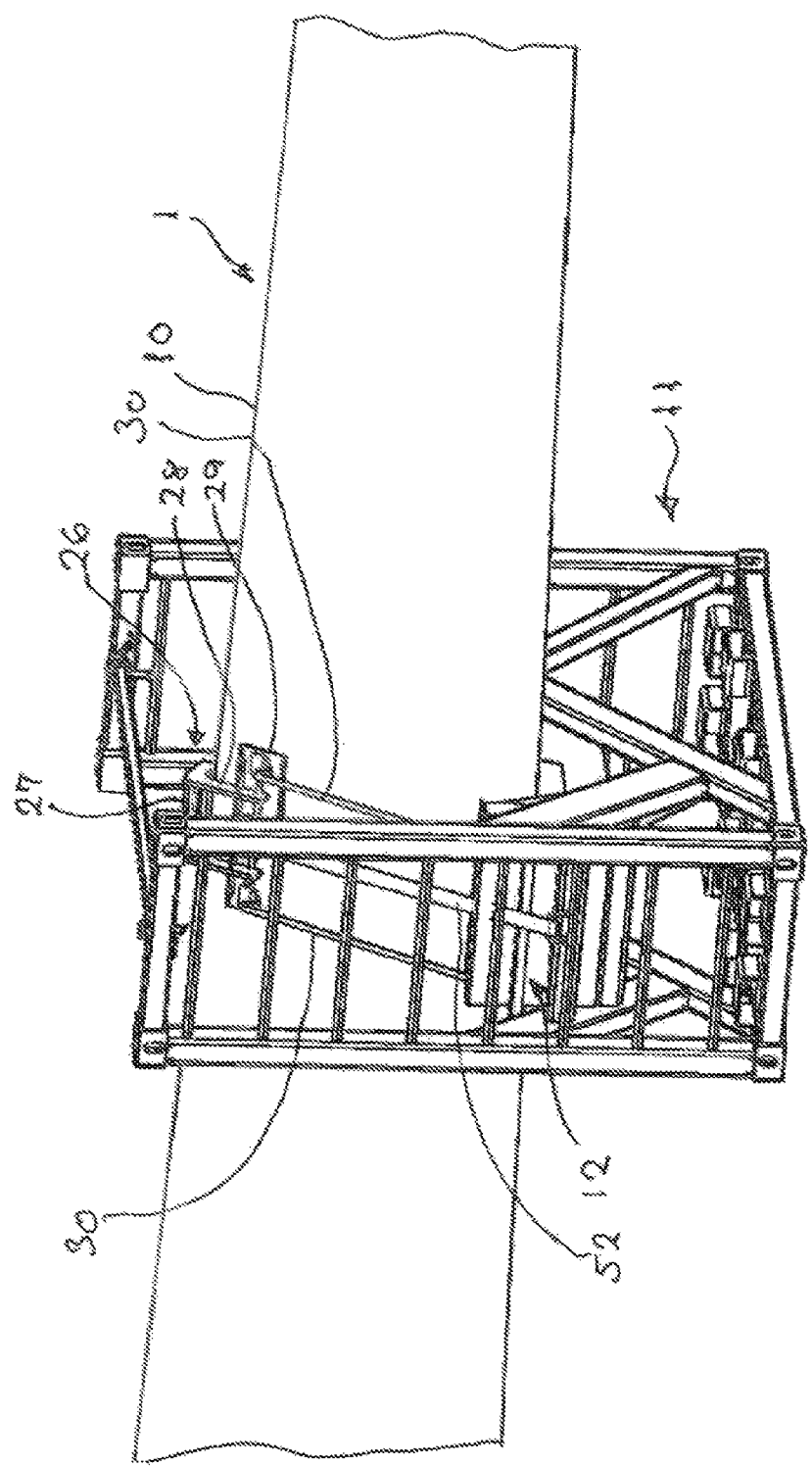
Figure 6:
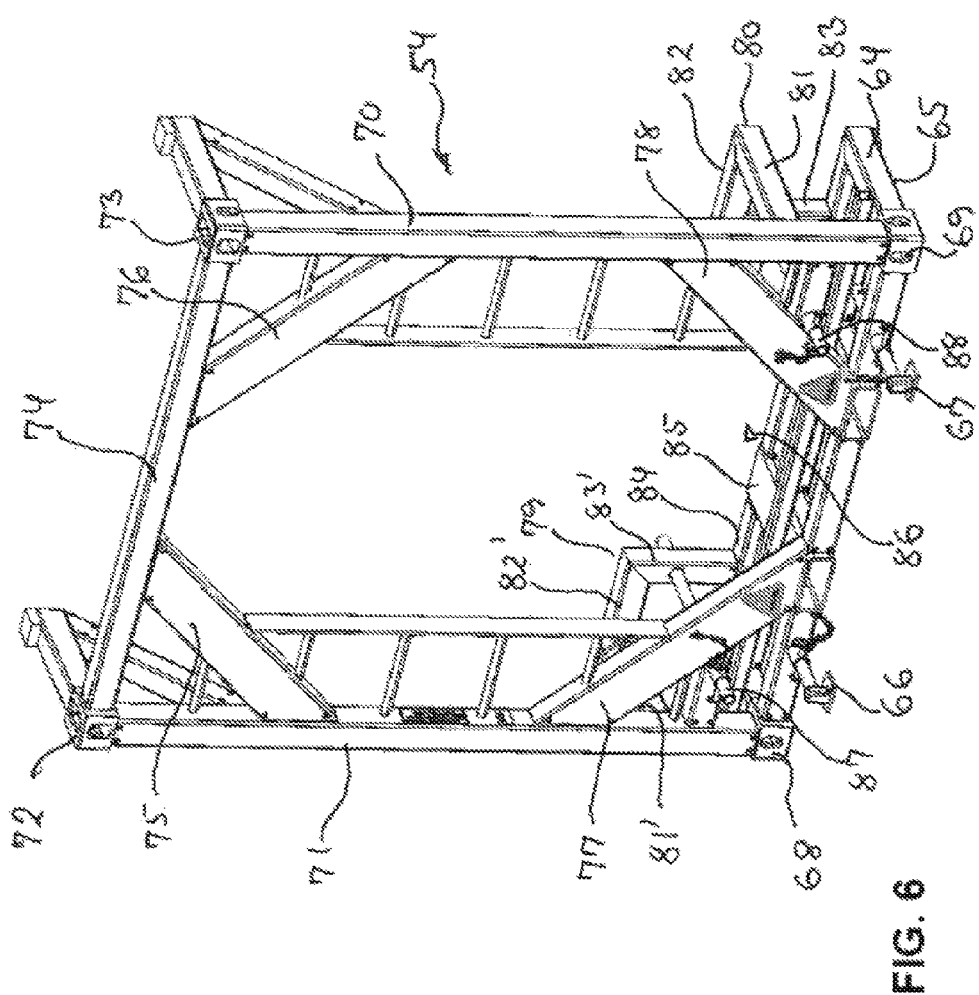
Figure 7:
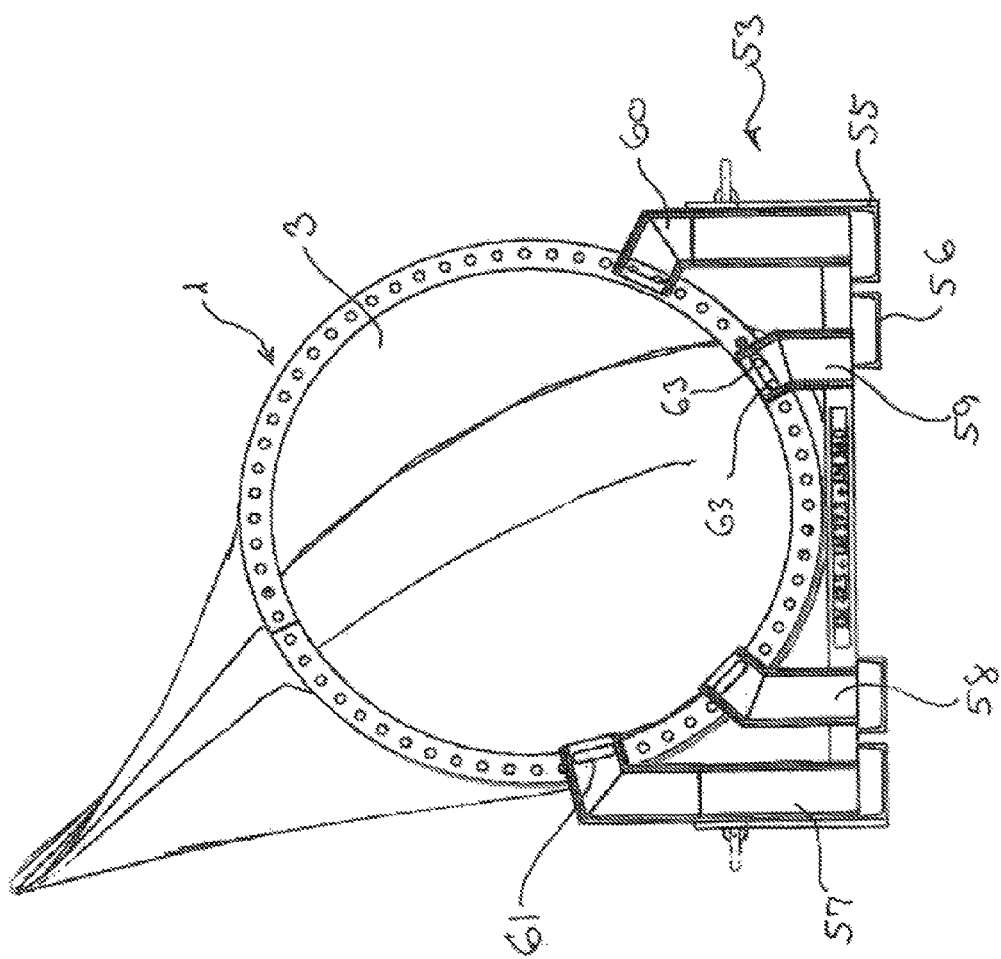
Figure 8:
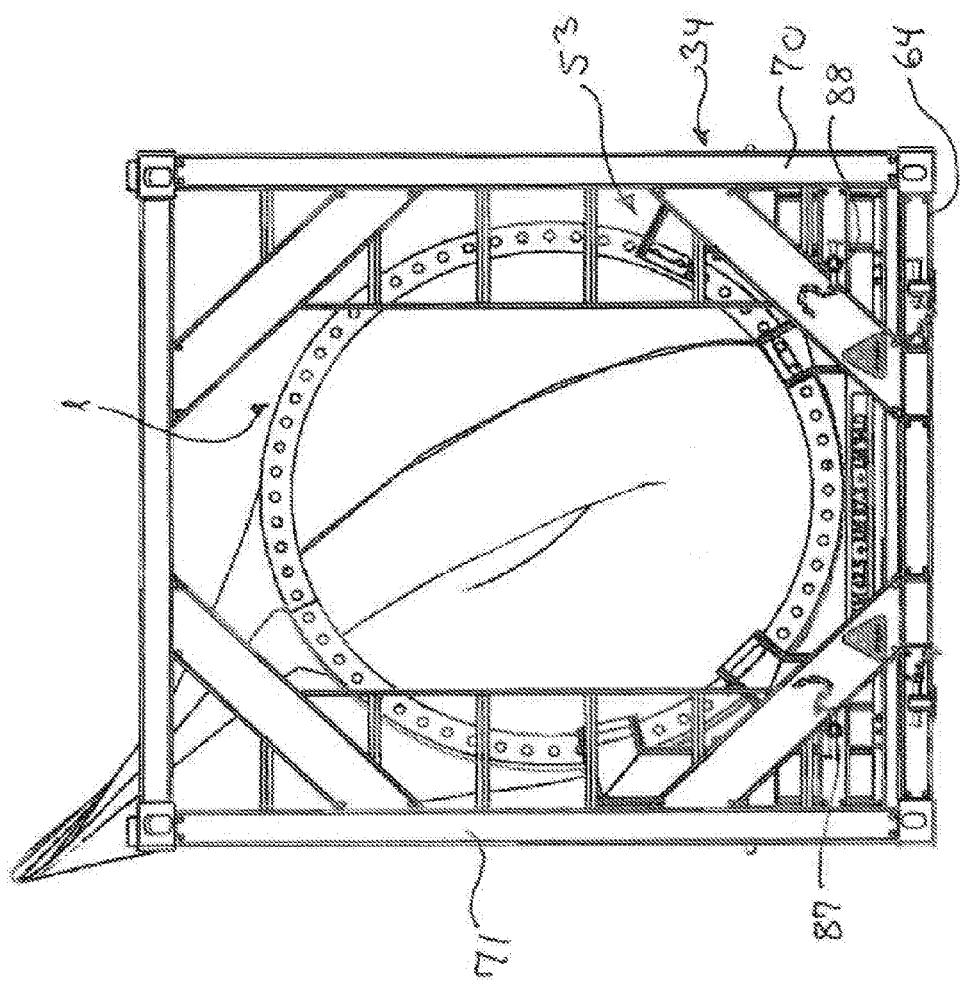

The invention is explained in detail below with reference to the drawing(s), in which
FIG. 1 is a view of a wind turbine blade,
FIG. 2 is a perspective view of a tip end frame,
FIG. 3 is a perspective view of a tip end receptacle,
FIG. 4 is a perspective view of a tip end of a blade received in the tip end receptacle,
FIG. 5 is a perspective view of a tip end received in the tip end receptacle which in turn is received in the tip end frame,
FIG. 6 is a perspective view of a root end frame,
FIG. 7 is a view of a root end fixture connected to the root end of a blade,
FIG. 8 is a view of the root end fixture received in the root end frame, the root end fixture being connected to the root end of the blade,
FIG. 9 is a perspective view of a first wind turbine blade stacked on top of a second wind turbine blade by using tip end frames with a tip end receptacle received therein and root end frames with root end fixtures received therein.

DETAILED DESCRIPTION OF THE INVENTION

The wind turbine blade 1 shown in FIG. 1 has a longitudinal axis L and comprises a root region 2 with a root end 3 being provided with connection means (not shown) for connecting the blade 1 to a hub of a wind turbine rotor. The blade 1 further comprises an airfoil region 4 providing lift when subjected to wind impact and ending in a tip 5. A transition region 6 is provided between the root region 2 and the airfoil region 4. The blade also comprises a pressure side 7 and a suction side 8 extending between a leading edge and a trailing edge 10. A chord 13 extends between the leading and the trailing edges of the blade. The chord 13 may be considered as defining the edge-wise direction E of the blade at a given point thereof, whereas a direction perpendicular to the chord may be considered as defining the flap-wise direction F at a given point of the blade.

The embodiment of the transportation and storage system according to the invention comprises a tip end frame assembly, which will be described below with reference to FIGS. 1-5, and a root end frame assembly, which will be described below with reference to FIGS. 6-8.

The tip end frame assembly comprises a tip end frame 11 shown in FIGS. 2 and 5 and a tip end receptacle 12 shown in FIGS. 3-4.

The tip end receptacle 12 shown in the figures comprises an upwardly open, box-shaped, rigid structure 14 formed of sheet metal and having a rectangular outline with a pair of opposite lateral faces 15, 16, the lateral face 16 being higher than the lateral face 15, and a pair of opposite transversely extending transverse faces 17, 18. The box-shaped structure 14 further comprises a planar bottom 19 having a lower surface 20 allowing the box-shaped structure to rest upright on a substantially horizontal surface, such as the ground, as shown in FIGS. 3-4. A block 21 is received in the interior of the box-shaped structure and an upper surface of the block 21 is shaped to form an upwardly open tip-receiving space 22 defined by a tip end-supporting surface 23. The tip end-supporting surface 23 is shaped to at least partly follow the surface contour of the tip end at the point thereof, where the tip end is intended to be support by the tip end-supporting surface 23.

More specifically, the tip end-supporting surface 23 is shaped to support the leading edge 9 of the blade 1 and adjacent portions of the suction side 8 and pressure side 7 of the blade 1. The portion 24 of the supporting surface 23 supporting the suction side 8 is larger than the portion 25 of the supporting surface 23 supporting the pressure side 7 of the blade 1.

As it further appears from FIGS. 3-4, the supporting surface 23 is shaped to support the blade 1 so that the chord 13 or the edge-wise direction E of the blade forms an acute angle with vertical. Preferably, the acute angle is of between 5-40°, alternatively of between 10-30°.

The block 21 or at least the supporting surface 23 thereof is formed of a material preventing scratching of the surface of the blade, such as a wood material, a rubber material, textile material or a polymer material, e.g. a foamed polymer, such as foamed polyurethane. In its entirety the block 21 may be formed of a foamed polymer, such as foamed polyurethane or a rubber material.

The tip end receptacle 12 further comprises retaining means for retaining the tip end of the blade in the receiving space 22. As shown in FIGS. 4-5, the retaining means may be formed of a strap device 26 comprising a U-shaped member 27 having two legs of which only one 28 is visible. The U-shaped member is also adapted to extend around the trailing edge 10 of the blade 1. Each leg 28 is provided with a contact member of which only one 29 is visible. Each contact member 29 is provided with a surface of a non-scratching material and adapted to be in contact with the pressure side 7 and the suction side 8 of the blade 1 opposite the supporting surface 24. The strap device 26 is further provided with straps 30 extending between the contact member 29 and the adjacent outer lateral wall of the box-shaped, rigid structure 14. By tightening the straps 30 the tip end of the blade is pressed against the supporting surface 23 and thus reliably retained in the tip end receptacle 12.

Referring now to FIG. 2, the tip end frame 11 of the tip end frame assembly comprises a first lateral frame part 31 and a second lateral frame part 32 being laterally interspaced. The frame parts 31, 32 are mutually rigidly connected by means of transversely extending and interspaced transverse frame parts 33, 34. The tip end frame 11 further comprises a base part 35 defining a bottom surface 36 allowing the tip end frame 11 to rest upright on the ground.

Each of the lateral frame parts 31, 32 has an rectangular shape and comprises upright interspaced and mutually parallel bars 37, 38; 37', 38'. At their lower and upper ends each of the upright bars are provided with standard container corners 39,39' and the upright bars 37, 38; 37', 38' are via the upper container corners 39' interconnected by means of an upper bar 40, and via the lower container corners 39 interconnected by means of a lower bar (90).

The base part 35 of the tip end frame comprises transverse lower bars 41, 42 connected to the lateral frame parts 31, 32 via the lower standard container corners 39 thereof.

Each of the transverse frame parts 33, 34 comprises a first oblique bar 43; 43' extending from an upper portion of the upright bar 38', 37' to a portion of the lower bar 41; 41' adjacent the lower standard container corner 39 of the opposite lateral frame part 32. A second oblique bar 44, 44' extends from about the mid-point of the first oblique bar 43 to a portion of the lower end of the upright bar of the first lateral frame part 31. Finally, a third oblique bar 45, 45' extends from a portion of the lower end of the first oblique bar to about a mid-point of the upright bar of a second lateral frame part 32. The first oblique bars 43, 43' are connected by means of a first upper connection bar 46 and a first lower connection bar 47. Correspondingly, the third oblique bars 45, 45' are interconnected by means of a second upper connection bar 48 and a second lower connection bar 49. The first upper connection bar 46 and the second upper connection 48 bar are arranged at the same level and are mutually parallel. Correspondingly, the first lower connection bar 47 and the second lower connection bar 49 are arranged at the same level and are mutually parallel. The first upper connection bar 46 and the second upper connection bar 48 are interspaced such that the distance between the inner surfaces thereof essentially corresponds to the distance between the pair lateral faces 15,16 of the box-shaped, rigid structure 14. The first oblique bars 43, 43' are interspaced such that the inwardly facing surfaces thereof are mutually spaced apart at a distance essentially corresponding to the distance between the transverse faces 17, 18 of the box-shaped, rigid structure 14. The upper faces of the first and the second lower connection bars 47, 49 provide a support for the lower surface of the tip end receptacle 12. Jointly with the upper connection bars 46, 48 and portions of the first oblique bars 43, 43' and the third oblique bars 45, 45', the lower connection bars 47,49 define an upwardly open receptacle-receiving space 50 for receiving the receptacle 12.

Additionally, inner faces of the first oblique bars and the third oblique bars and the upper connection bars form positioning means adapted to cooperate with the outer faces 15, 16; 17,18 of the box-shaped, rigid structure 14 of the tip end receptacle 12 to position the receptacle 12 when it is lowered into the receptacle-receiving space 50 of the tip end frame.

Further, the tip end frame 11 comprises an attachable and removable top bar 51 adapted to extend between upper portions of the lateral frame parts 31, 32 to provide additional lateral stiffness to the tip end frame. The top bar 51 is attached after the receptacle has been received in the receptacle-receiving space 50.

It should further be mentioned that the tip end frame 11 comprises connection means for releasably connecting the tip end receptacle to the tip end frame.

As shown in FIG. 5, the connection means may be formed of one or more straps 52 extending between the strap device 26 and the adjacent upper connection bar 46; 48 of the tip end frame 11.

The root frame assembly comprises a root end fixture 53 and a root end frame 54, as shown in FIGS. 6-8. The root end fixture 53 is formed of a number of metal bars and comprises a bottom part 55 defining a lower surface 56 allowing the root end fixture to rest on the ground. Four bars 57-60 extend upwardly from the bottom part 55 of the root end fixture. The upper ends of the bars 57-60 are arranged in a common plane forming a longitudinal positioning means for positioning the root end fixture relative to the root end 3 of the blade 1 in longitudinal direction.

At their upper ends, each of the bars 57-60 is provided with an oblong, through-going hole 61. The hole 61 is arranged on a circle corresponding to the circle of connection elements in the root end of the blade used for connecting the blade to the hub of a wind turbine. In the present example, the through-going hole 61 is adapted to receive bolts 63 adapted to be connected to threaded bushings in the root end. The bolts 63 are here used to connect the root end fixture 53 with the root end 3 of the blade 1. The outline of the bottom part 55 of the root end fixture 53 is essentially rectangular.

As it especially appears from FIG. 6, the root end frame 54 comprises a lower base part 64 defining a bottom surface 65 allowing the root end frame to rest on the ground. The lower base part 64 is formed as a latticework of bars and comprises extendable support legs 66, 67 which can be extended to allow the root end frame to reliably stand upright. Forward corners of the lower base part 64 are formed of standard container corners 68, 69. An upright bar 70, 71 extends from each of the standard container corners 68, 69. At the upper end thereof, each upright bar is provided with an upper standard container corner 72, 73 interconnected by means of an upper transverse bar 74. For stiffening the root end frame upper oblique bars 75,76 extend between the upper transverse bar 74 and the adjacent upright bar 70;71 and lower oblique bars 77,78 extend between the lower base part 64 and the uprights bars 70, 71.

The root end frame 54 further comprises bar structures 79, 80 extending rearwardly from a lower portion of respective upright bars 70, 71. Each bar structure 79,80 is formed of a rearwardly extending bar 81, 81', an inwardly extending bar 82, 82' and a downwardly extending bar 83,83' being connected to a transversely extending bar 84 of the lower base part 64 of the root end frame 54. Jointly with inwardly facing surfaces of the lower oblique bars 77, 78 and an upper surface 85 of the lower base part 64 inwardly facing surfaces of the bars forming the bar structures 79, 80 define an upwardly open root end fixture-receiving space 86 in which the lower portion of the root end fixture is adapted to being received by being lowered thereinto.

The above inwardly facing surfaces defining the root end fixture-receiving space 86 define a shape essentially corresponding to the outline of the lower portion of the root end fixture. The inwardly facing surfaces provide positioning means for the root end frame cooperating with corresponding outer surfaces of the root end fixture for positioning the root end fixture relative to the root end frame.

Finally, it should be noted that the root end frame 54 comprises attaching means for attaching and locking the root end fixture to the root end frame. In the present example, the attaching means is formed of two locking rods 87, 88 which can be brought into engagement with openings in the root end frame above the bottom part 55 of the root end fixture 53 to retain the root end fixture 53 in the root end fixture-receiving space 86 of the root end frame 54.

FIG. 9 illustrates that root end frames and tip end frames with wind turbine blades attached thereto can be stacked on top of each other by using not clearly shown twist locks 89 to connect the upper standard container corners of the lower root end frame and the lower tip end frame with the lower standard container corners of the upper root end frame and the upper tip end frame. Although two stacks of blades are shown, it is possible to stack more than two blades.

LIST OF REFERENCE NUMERALS 1 wind turbine blade
L longitudinal axis
2 root region
3 root end
4 airfoil region
5 tip
6 transition region
7 pressure side
8 suction side
9 leading edge
10 trailing edge
11 tip end frame
12 tip end receptacle
13 chord
E edge-wise direction
F flap-wise direction
14 box-shaped rigid structure
15-16 pair of lateral faces
17-18 pair of transverse faces
19 planar bottom
20 lower surface
21 block
22 tip end-receiving space
23 tip end-supporting surface
24 large portion of the supporting surface
25 small portion of the supporting surface
26 strap device
27 U-shaped member
28 leg
29 contact member
30 straps
31 first lateral frame part
32 second lateral frame part
33-34 transverse frame part
35 base part
36 bottom surface
37,37' upright bar
38,38' upright bar
39,39' standard container corner
40 upper bar
41-42 transverse lower bar
43,43' first oblique bar
44,44' second oblique bar
45,45' third oblique bar
46 first upper connection bar
47 first lower connection bar
48 second upper connection bar
49 second lower connection bar
50 receptacle-receiving space
51 top bar
52 strap
53 root end fixture
54 root end frame
55 bottom part
56 lower surface
57-60 upwardly extending bars
61 through-going hole
63 bolts
64 lower base part
65 bottom surface
66-67 support
68-69 lower standard container corners
70-71 upright bars
72-73 upper standard container corners
74 upper transverse bar
75-76 upper oblique bar
77-78 lower oblique bar
79,80 bar structure
81,81' rearwardly extending bar
82,82' inwardly extending bar
83,83' downwardly extending bar
84 transversely extending bar
85 upper surface
86 root end fixture-receiving space
87-88 locking rods
89 twist lock
90 lower bar

The invention claimed is:

1. A transportation and storage system for a wind turbine rotor blade (1) having a longitudinal axis (L) and comprising a root end (3), a root region (2), an airfoil region (4) with a tip (5), a pressure side (7) and a suction side (8) extending between a leading edge (9) and a trailing edge (10), the system comprising:
    a tip end frame assembly comprising:
        an inner tip end receptacle (12) comprising:
            an upwardly open tip end-receiving space (22) for receiving a portion of the tip end of the blade and having a supporting surface (23) for supporting the blade,
            a lower surface (20) allowing the inner tip end receptacle to rest upright on a substantially horizontal surface,
            releasable retaining parts (26) for releasably retaining the tip end of the blade in the receiving space (22) of the inner tip end receptacle (12), and
        an upwardly open rigid structure (14) accommodating a block (21) of material therein, the block forming the supporting surface (23) of the tip end-receiving space (22); and an outer tip end frame (11) comprising:
an upwardly open receptacle-receiving space (50) for receiving the inner tip end receptacle and provided with positioning parts for positioning the inner tip end receptacle (12) in the outer tip end frame,
a first lateral frame part (31) and a second lateral frame part (32) laterally spaced apart and mutually rigidly connected by transversely extending and interspaced transverse frame parts (33;34) upwardly open to avoid interference with the blade arranged in the inner tip end receptacle (12) received in the receptacle-receiving space (50) of the outer tip end frame (11), and
a base part (35) defining a bottom surface (36) allowing the outer tip end frame to rest upright on a substantially horizontal surface;
wherein the inner tip end receptacle is releasable from the outer tip end frame.

2. The system according to claim 1, wherein the supporting surface (23) of the inner tip end receptacle (12) is shaped to at least partly conform to a surface contour of the blade.

3. The system according to claim 1, wherein the supporting surface (23) of the inner tip end receptacle (12) is shaped to support a portion of the leading edge (9) and trailing edge (10) and an adjacent portion of the suction side (8) and an adjacent portion of the pressure side (7) of the blade.

4. The system according to claim 1, wherein the supporting surface (23) of the inner tip end receptacle (12) is made of a material preventing scratching of the surface of the blade.

5. The system according to claim 1, wherein the outer tip end frame (11) comprises lower stacking parts (39) in a base part thereof and upper stacking parts (39') at a top thereof, the lower stacking parts arranged to be connected with the upper stacking parts by locking parts to allow stacking of a first outer tip end frame on top of a second outer tip end frame, the lower stacking parts defining at least a portion of the bottom surface (36) of the outer tip end frame.

6. The system according to claim 5, wherein the lower stacking parts and the upper stacking parts (39) are standard container corners interspaced by a distance corresponding to a standard used in transportation containers.

7. The system according to claim 5, wherein the lower stacking parts and upper stacking parts (39) are standard container corners interspaced by a distance corresponding to a standard used in handling of containers.

8. The system according to claim 1, wherein the outer tip end frame comprises connecting parts (30) for releasably connecting the inner tip end receptacle with the outer tip end frame.

9. The system according to claim 1, wherein the transverse frame parts (33,34) of the outer tip end frame (11) are longitudinally interspaced so that inwardly facing surfaces thereof provide longitudinal positioning parts for the inner tip end receptacle (12); and wherein the transverse frames parts (33,34) are interconnected by connection parts, comprising interspaced and parallel bars (47,49) forming a support for the lower surface of the inner tip end receptacle (12) and by interspaced bars (46,48) with inwardly facing surfaces providing lateral positioning parts for the inner tip end receptacle.

10. The system according to claim 1, further comprising a root frame assembly comprising:
a root end fixture (53) and a root end frame (54),
the root end fixture (53) adapted to be temporarily received in the root end frame (54) and comprising:
longitudinal positioning parts for longitudinally positioning the root end fixture (53) relative to the root end (3) of the blade,
releasable connecting parts for releasably connecting the root end fixture (53) to the root end (3) of the blade, and
a lower surface (56) allowing the root end fixture to rest on a substantially horizontal surface,
the root end frame (54) comprising:
positioning parts for positioning the root end fixture (53) relative to the root end frame (54), and
a lower base part (64) defining a bottom surface (65) allowing the root end frame (54) to rest on a substantially horizontal surface.

11. The system according to claim 10, wherein the root end frame (54) comprises an upwardly open root end fixture-receiving space (86) for receiving a lower portion of the root end fixture (53), the receiving space (86) defined by mutually facing surfaces of lateral transversely interspaced frame parts (81,81') and mutually facing surfaces of longitudinally interspaced frame parts, the mutually facing surfaces of the transversely interspaced and longitudinally interspaced frame parts (82,82';77,78), respectively, forming the positioning parts of the root end frame cooperating with corresponding outer surfaces of the root end fixture (53') for positioning the root end fixture (53') relative to the root end frame (54).

12. The system according to claim 10, wherein the root end frame (54) comprises lower stacking parts (68,69) at a bottom surface thereof and upper stacking parts (72,73) at a top thereof, the lower stacking parts arranged to be connected with the upper stacking parts to allow stacking of a first root frame on top of a second root frame, the lower stacking parts defining at least a portion of the bottom surface (65) of the root end frame, allowing the root end frame to rest on a substantially horizontal surface.

13. The system according to claim 1, wherein the portion of the tip end of the blade is a point of the outer 50% of the blade.

14. The system according to claim 1, wherein the lower and the upper stacking parts (39) are standard container corners interspaced by a distance corresponding to a standard used in handling of containers.

* * * * *